United States Patent
Smirnov et al.

(10) Patent No.: US 8,504,311 B2
(45) Date of Patent: *Aug. 6, 2013

(54) METHOD AND MASS FLOW CONTROLLER FOR ENHANCED OPERATING RANGE

(75) Inventors: Alexei V. Smirnov, Fort Collins, CO (US); Michael J. Zolock, Berthoud, CO (US)

(73) Assignee: Hitachi Metals, Ltd., Tokyo (JP)

( * ) Notice: Subject to any disclaimer, the term of this patent is extended or adjusted under 35 U.S.C. 154(b) by 521 days.

This patent is subject to a terminal disclaimer.

(21) Appl. No.: 12/757,582

(22) Filed: Apr. 9, 2010

(65) Prior Publication Data

US 2011/0247390 A1    Oct. 13, 2011

(51) Int. Cl.
*G01F 25/00* (2006.01)
(52) U.S. Cl.
USPC ............................. 702/45; 324/451; 73/1.16
(58) Field of Classification Search
USPC .......................................................... 702/45
See application file for complete search history.

(56) References Cited

U.S. PATENT DOCUMENTS

| | | |
|---|---|---|
| 5,062,446 A | 11/1991 | Anderson |
| 5,141,021 A | 8/1992 | Shimomura et al. |
| 5,410,912 A * | 5/1995 | Suzuki ................. 73/204.15 |
| 6,655,408 B2 | 12/2003 | Linthorst |
| 7,237,440 B2 | 7/2007 | Gysling et al. |
| 7,272,512 B2 | 9/2007 | Wang et al. |
| 2005/0126306 A1 * | 6/2005 | Wang et al. ................. 73/861.77 |
| 2005/0261842 A1 | 11/2005 | Yamagishi et al. |
| 2007/0084280 A1 | 4/2007 | Gill et al. |
| 2007/0113641 A1 | 5/2007 | Ding et al. |
| 2008/0211510 A1 * | 9/2008 | Zolock et al. ................. 324/451 |
| 2010/0223991 A1 | 9/2010 | Muraoka et al. |
| 2011/0247696 A1 | 10/2011 | Zolock et al. |

* cited by examiner

*Primary Examiner* — Marc Armand
*Assistant Examiner* — Haidong Zhang
(74) *Attorney, Agent, or Firm* — Neugeboren O'Dowd PC

(57) ABSTRACT

A mass flow controller (MFC), a method for calibrating an MFC, and a method for operating an MFC are disclosed. The method for calibrating the MFC includes obtaining data relative to two signals from a thermal mass flow sensor when operating the mass flow controller at different flow rates with a calibration gas, and storing the data relating to the two signals in connection with corresponding flow-rate values. The method for operating the MFC includes obtaining data relative to the two signals from the thermal mass flow controller and accessing the calibration data to determine an unknown flow rate for a process gas that may be the same gas as the calibration gas or may be another gas that is different from the calibration gas.

7 Claims, 15 Drawing Sheets

CALIBRATION DATA

| Flow | Value Indicative of first (Differential) output | Value Indicative of second (top) output | $R_c$ | Amplitude |
|---|---|---|---|---|
| 0 | Dcal(0) | $T_{cal}(0)$ | | |
| $fcal_1$ | $Dcal_1$ | $Tcal_1$ | $(Tcal_1(fcal_1)-Tcal(0))/Dcal_1(fcal_1)$ | $sqrt[(Tcal_1(fcal_1)-Tcal(0))^2 + Dcal_1(fcal_1)^2]$ |
| $fcal_2$ | $Dcal_2$ | $Tcal_2$ | $(Tcal_2(fcal_2)-Tcal(0))/Dcal_2(fcal_2)$ | $sqrt[(Tcal_2(fcal_2)-Tcal(0))^2 + Dcal_2(fcal_2)^2]$ |
| ⋮ | ⋮ | ⋮ | ⋮ | ⋮ |
| $fcal_N$ | $Dcal_N$ | $Tcal_N$ | $(Tcal_N(fcal_N)-Tcal(0))/Dcal_N(fcal_N)$ | $sqrt[(Tcal_N(fcal_N)-Tcal(0))^2 + Dcal_N(fcal_N)^2]$ |

FIG. 13A

OPERATIONAL DATA

| Flow (f) | Differential Voltage | Top Voltage | Ratio ("R") | SF |
|---|---|---|---|---|
| 0 | D(0) | T(0) | | |
| f=fcal/SF | D(f) | T(f) | $(T(f)-T(0))/D(f)$ | Amplitude/ $sqrt[(T(f)-T(0))^2 + D(f)^2]$ |

FIG. 13B

METHOD AND MASS FLOW CONTROLLER FOR ENHANCED OPERATING RANGE

FIELD OF THE INVENTION

The present invention relates generally to mass flow controllers. In particular, but not by way of limitation, the present invention relates to methods and systems for controlling a mass flow controller.

BACKGROUND OF THE INVENTION

A typical mass flow controller (MFC) is a closed-loop device that sets, measures, and controls the flow of a gas in industrial processes such as thermal and dry etching. An important part of a MFC is a sensor that measures the mass flow rate of the gas flowing through the device. The MFC compares an output signal from the sensor with a predetermined set point and adjusts a control valve to maintain the mass flow rate of the gas at the predetermined set point.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

In one embodiment, the invention may be characterized as a mass flow controller comprising a bridge circuit including a first, second, third, and fourth nodes. In this embodiment a first resistive component is connected between the first and second nodes; a second resistive component is connected between the second and third nodes; a first sensing element is connected between the first and fourth nodes; and a second sensing element is connected between the fourth and third nodes. In addition, a first processing portion provides a first output that is indicative of a voltage differential between the second and fourth nodes, and a second processing portion provides a second output indicative of the voltage between the first node and the third node. A look-up table includes calibration data to map flow values of a calibration gas with calibration data, the calibration data being based upon values of the first output and the second output that correspond to the flow values of the calibration gas in the calibration data; and a control portion is configured to access the look-up table and calculate a flow value of a process gas based upon the calibration data and the first and second outputs when the process gas is controlled by the mass flow controller.

Another illustrative embodiment includes a mass flow controller comprising a thermal mass flow sensor that provides a first voltage and a second voltage, each of the first and second voltages varying as a flow of a gas varies; and a look-up table including calibration data that maps flow values of a calibration gas to calibration data, the calibration data being based upon values of the first signal and the second signal that correspond to flow values of a calibration gas; and a control portion configured to access the look-up table and calculate a flow value of a process gas based upon the calibration data and the first and second signals when the process gas is controlled.

Another illustrative embodiment is a method for calibrating a mass flow controller comprising: opening a valve of the mass flow controller to a first position to allow a calibration gas to flow through the mass flow controller; measuring a flow rate of a calibration gas through the mass flow controller when the valve is at the first position; obtaining a first measurement that is indicative of a voltage at a first node of a bridge circuit of a thermal mass flow sensor of the mass flow controller when the valve is at the first position; obtaining a second measurement that is indicative of a voltage between two other nodes of bridge circuit of the thermal mass flow sensor of the mass flow controller; storing, in a memory of the mass flow controller, information that is indicative of the measured flow rate, the first measurement, and the second measurement so as to provide stored information that relates the voltage at the first node, the voltage between the two nodes and the flow rate of the calibration gas.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

FIGS. 13A and 13B are tables depicting calibration data and operational data, respectively.

DETAILED DESCRIPTION

Figure 1:
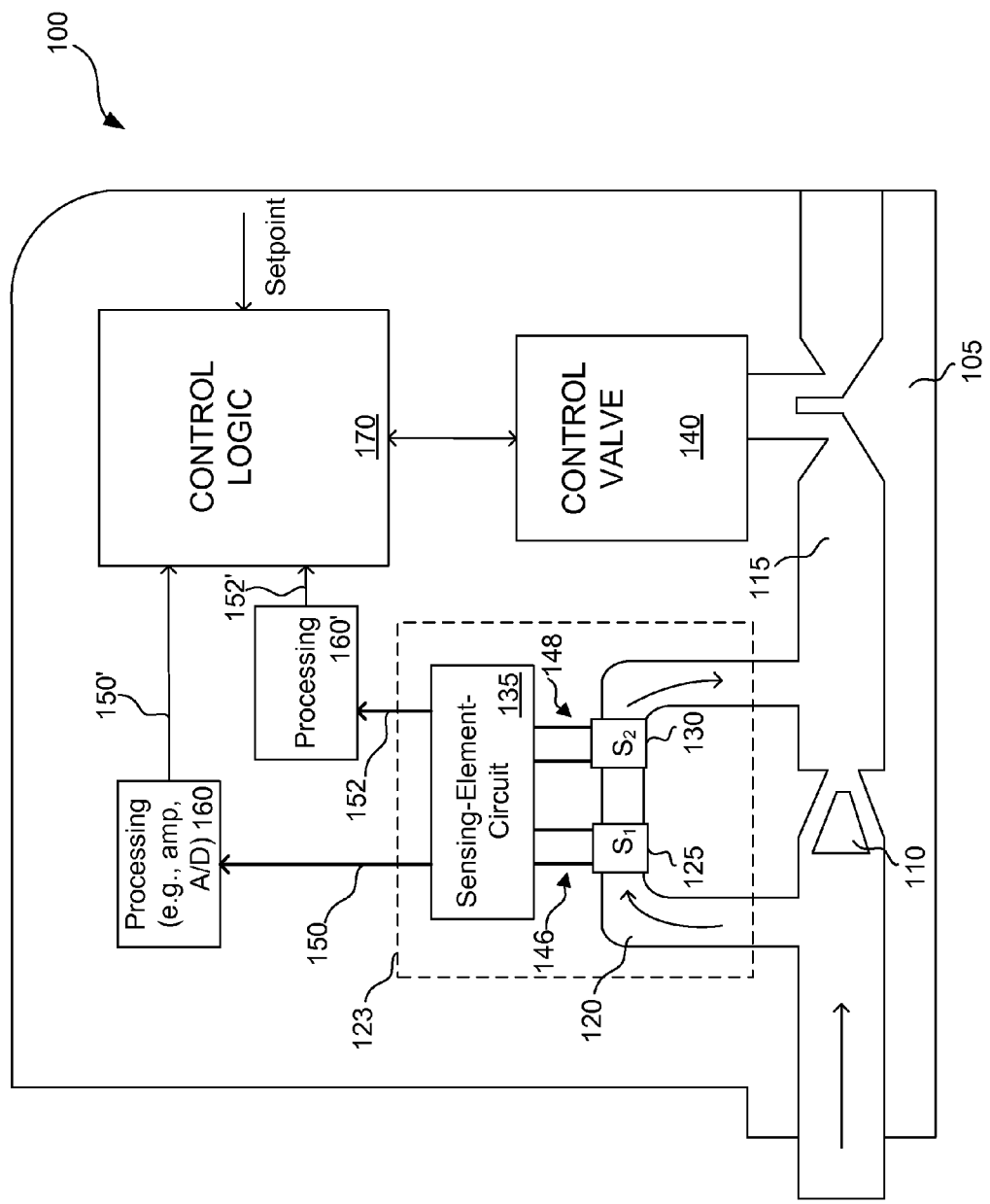
FIG. 1 is a functional block diagram of a mass flow controller in accordance with an illustrative embodiment of the invention.

Referring now to the drawings, where like or similar elements are designated with identical reference numerals throughout the several views where appropriate, and referring in particular to FIG. 1, it is a functional block diagram of an MFC 100 in accordance with an illustrative embodiment of the invention. The illustrated arrangement of these components is logical and not meant to be an actual hardware diagram. Thus, the components can be combined, further separated, deleted and/or supplemented in an actual implementation. As one of ordinary skill in the art will appreciate, the components depicted in FIG. 1 may be implemented in hardware, firmware, software, or any combination thereof. Moreover, in light of this specification, the construction of each individual component is well-known to those of skill in the art.

As depicted, in the present embodiment a base 105 of MFC 100 includes bypass 110 through which a gas flows. Bypass 110 directs a constant proportion of gas through main path 115 and sensor tube 120. As a consequence, the flow rate of the fluid (e.g., gas or liquid) though the sensor tube 120 is indicative of the flow rate of the fluid flowing through the main path of the MFC 100.

In this embodiment, the sensor tube 120, is a small bore tube that is part of a thermal mass flow sensor 123 of the MFC 100. And as shown, sensing elements 125 and 130 are coupled to (e.g., wound around) the outside of sensor tube 120. In one illustrative embodiment, sensing elements 125 and 130 are resistance-thermometer elements (e.g., coils of conductive wire), but other types of sensors (e.g., resistance temperature detectors (RTD and thermocouples) may also be utilized.

As depicted, sensing elements 125 and 130 are electrically connected to a sensing-element circuit 135. In general, the sensing-element circuit 135 is configured (responsive to signals 146, 148 from the sensing elements 125, 130) to provide two output signals 150, 152, each of which are separately and/or together are indicative of the flow rate through the sensor tube 120, and hence, indicative of the flow rate through the main path 115 of the MFC 100.

In many implementations (e.g., where a calibration gas is the same as a process gas), the first output signal 150 provides a more accurate indication of the flow rate through the MFC 100 when the flow rate is within a first range, and the second output signal 152 provides a more accurate indication of the flow rate through the MFC 100 when the flow rate is within a second range. In one embodiment for example, the first output signal 150 provides a more accurate indication of the flow rate than the second signal 152 when the flow rate is in a low range (e.g., 0 to 2.0 sccm), and the second output signal 152 provides a more accurate indication of the flow rate than the first output signal 150 when the flow rate is within a high range (e.g., 2.0 sccm to 20.0 sccm)

At high flow rates, it has been found that the signals 150, 152 are substantially more dependent upon the type of process gas that is being controlled by the MFC 100. More particularly, if the process gas is different than a calibration gas (i.e., the gas that is used to calibrate the MFC 100), the signals 150, 152, without additional processing, often do not provide an accurate indication of the flow rate. As a consequence, in other embodiments described further herein with reference to FIGS. 5-13, the MFC 100 utilizes a novel methodology that enables the MFC 100 to utilize calibration data (e.g., calibration data based upon a single calibration gas), in connection with the first output signal 150 and the second output signal 152 so that the MFC 100 arrives at an accurate indication of the flow rate—even if the calibration data is based upon a calibration gas that is different from the process gas. In addition, when the MFC 100 operates according to the methodology described with reference to FIG. 5-13, both signals may be used simultaneously over most, or over the entire, operating range to arrive at an accurate indicate of the flow rate.

As a consequence, in general, the MFC 100 is capable of accurately measuring and controlling a flow rate over a broader flow range than typical prior art MFCs that process a single flow signal from a thermal sensor.

As shown in FIG. 1, the output signals 150, 152 may be processed by processing portions 160, 160' to generate processed-representations 150', 152' of the first and second output signals 150, 152. For example, processed-representations 150', 152' may be respective digital representations of the output signals 150, 152. More specifically, the processing portions 160, 160' may amplify and convert, using an analog to digital converter, the output signals 150, 152 to digital representations of the output signals 150, 152.

As one of ordinary skill in the art will readily recognize, the processing portions 160, 160' may also adjust each of the signals 150, 152 (e.g., by adjusting each of the signals by predetermined calibration coefficients) based upon physical characteristics of the MFC 100 and/or characteristics of the fluid (e.g., gas) flowing through the MFC 100.

The control logic 170 in this embodiment is generally configured to control a position of the control valve 140 based upon one, or both, of the output signals 150, 152. In some embodiments (e.g., embodiments described with reference to FIGS. 5-13), the control logic 170 may utilize both signals 150, 152 simultaneously to control flow of the mass flow controller 100. In other embodiments (e.g., when a calibration gas is the same as a process gas), control logic 170 is configured to utilize the first output signal 150 (e.g., by responding to the processed-representation of the first output signal 150') when the MFC 100 is providing (e.g., responsive to a setpoint signal) a mass flow that is within a first range, and to utilize the second output signal 152 (e.g., by responding to the processed-representation of the second output signal 152') when the MFC 100 is providing a mass flow that is within a second range.

Although not required, in many variations of the embodiments in which the first signal 150 is used in connection with low flow rates and the second signal 152 is used in connection with high flow rates (e.g., embodiments where the calibration gas and the process gas are the same), the ranges within which the control logic 170 utilizes the first and second output signals 150, 152 overlap. As a consequence, there may be three flow-rate-ranges in these embodiments: 1) a flow-rate-range where only the first output signal is utilized; 2) a flow-rate-range where both the first and second output signals are simultaneously utilized (e.g., where the flow-rate-ranges associated with the first and second output signals overlap); and 3) another flow-rate-range in which only the second output signal is utilized.

For example, in terms of full scale flow, the first range (in which the first output signal 150 gives more accurate indication of the flow rate than the second output signal 152) may cover 0 to 25% and the second range (in which the second output signal 152 provides a more accurate indication of flow rate than the first output signal 150) may cover 15% to 100% full scale flow. It should be recognized that these ranges are merely exemplary and that the low, high and overlap ranges may vary depending upon several factors including the architecture of the sensing element circuit.

Continuing this example, the control logic 170 may be configured to control the valve 140 using only the first output signal 150 (e.g., the processed representation 150') when the setpoint signal is demanding less than 15% full scale, and use the second output signal 152 (e.g., the processed representation 152') when the setpoint signal is demanding more than 25% full scale. And when the setpoint signal is demanding a flow rate between 15% and 25% (inclusive), both output signals 150, 152 are utilized simultaneously. And in some variations, the use of the first output signal 150 is gradually reduced (while the use of the second output signal 152 is gradually increased) as the overlap range (e.g., 15% to 25%) is traversed from low to high.

Continuing again with the previous example, if the MFC is operating at 20% full scale flow 50% of each signal may be used (e.g., each signal 150, 152 (or representations 150', 152')) is multiplied by 50% and then added together to generate a control signal for the control valve). And if the setpoint signal is 17% of full scale, 80% of the first output signal 150 and 20% of the second output signal may be summed together to generate a control signal for the control valve 140. It should be recognized that these percentages are merely exemplary of potential operating characteristics of the MFC 100.

Figure 2:
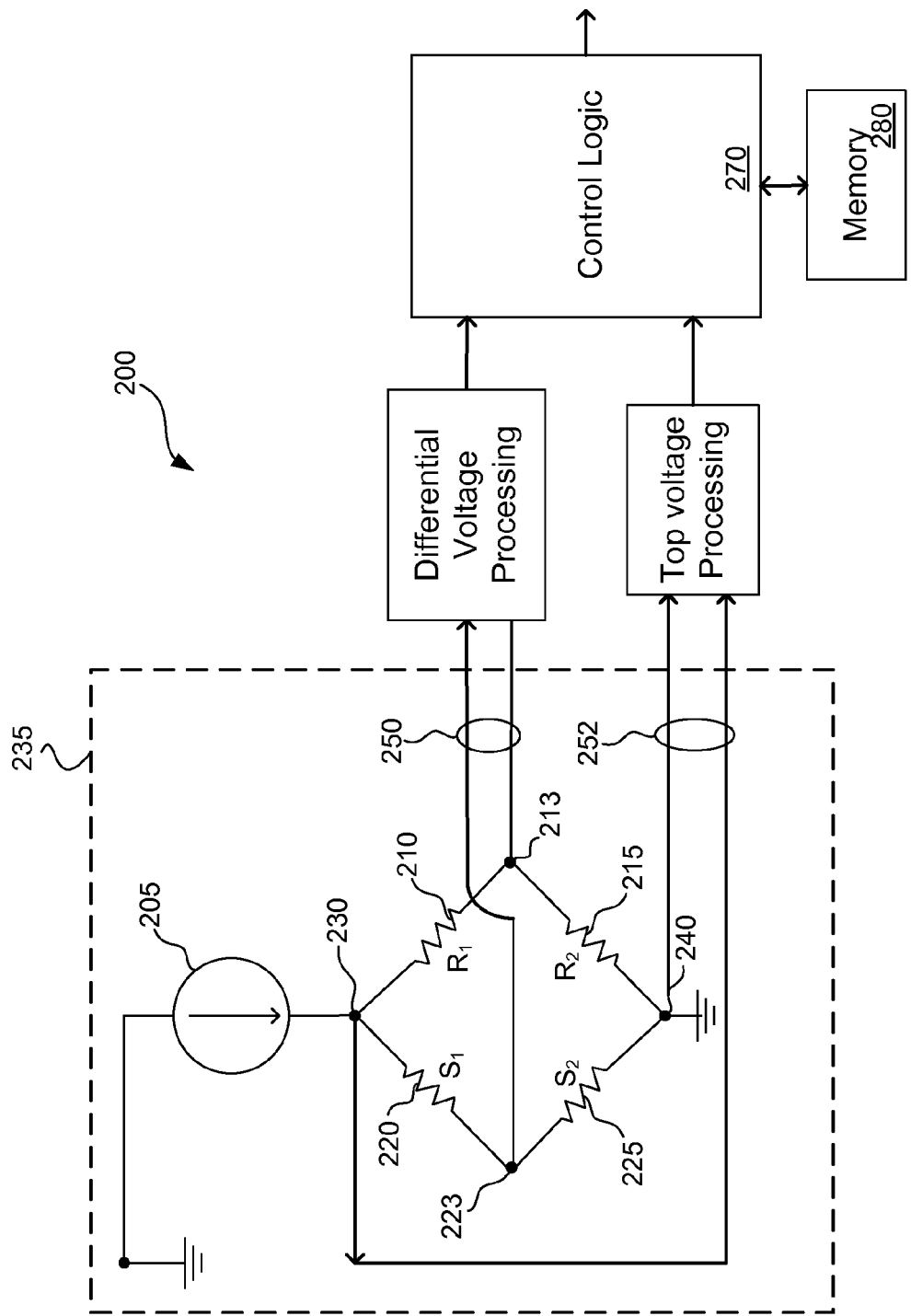
FIG. 2 is a block diagram of an exemplary circuit that may be used in connection with the mass flow controller of FIG. 1.

The sensing-element circuit 135 may be realized by a variety of circuit architectures. Referring to FIG. 2 for example, it is a functional block diagram of a portion 200 of an MFC (e.g., MFC 100) including an exemplary sensing-element circuit 235, which may be utilized to realize the sensing-element-circuit 135 described with reference to FIG. 1. As shown, a current source 205 supplies a substantially constant electrical current to a bridge circuit, which includes four nodes (230, 213, 240, and 223) between which elements are connected.

Among those elements are two fixed resistive elements 210 and 215 ($R_1$ and $R_2$, respectively). In one illustrative embodiment, fixed resistive elements 210 and 215 are both 10 kOhm precision resistors. Resistances 220 and 225 ($S_1$ and $S_2$), which form a leg of the bridge circuit in this embodiment, are temperature-dependent resistances (e.g., coils) that correspond to sensing elements 125 and 130, respectively. Those skilled in the art will notice that sensing elements 125 and 130 have one node, node 223, in common.

The current source 205 in this embodiment supplies sensing elements 220 and 225 with a substantially constant electrical current, resulting in the heating of sensor tube 120. The gas flow produces a temperature differential, which produces the first output voltage, between a second node 213 and a fourth node 223, and a second output voltage 252 between a first node 230 and a third node 240 changes because the average temperature of the sensors is decreasing due to gas flow.

The output voltage 250 varies with the temperature differential between sensing elements 220 and 225 in an approximately proportional manner, and voltage 252 varies, in a nonlinear manner, based upon average temperature. As depicted, the output voltages 250, 252 may be fed to processing components to be processed (e.g., fed to a differential amplifier, digitized, calibrated, and normalized) so that the control logic may utilize the first and second output signals 250, 252 to control the control valve. As discussed further herein (e.g., with reference to FIGS. 11, 12, 13A and 13B), the memory 280 may include calibration data in the form of a look up table that maps data that is based upon processed representations of the two signals 250, 252 to flow values for a calibration gas, and during operation, the look up table is accessed to determine actual flow values when a process gas is being controlled.

In this exemplary embodiment, the first output signal 250 is an accurate indication of the flow rate through the MFC 100 when the flow rate is within in a low flow-rate-range (e.g., 0 to 2 sccm). And Applicants have discovered that the second output signal 252 is a more accurate indication of the flow rate through the MFC 100 when the flow rate is within in a high flow-rate-range (e.g., 2 to 20 sccm).

Figure 3:
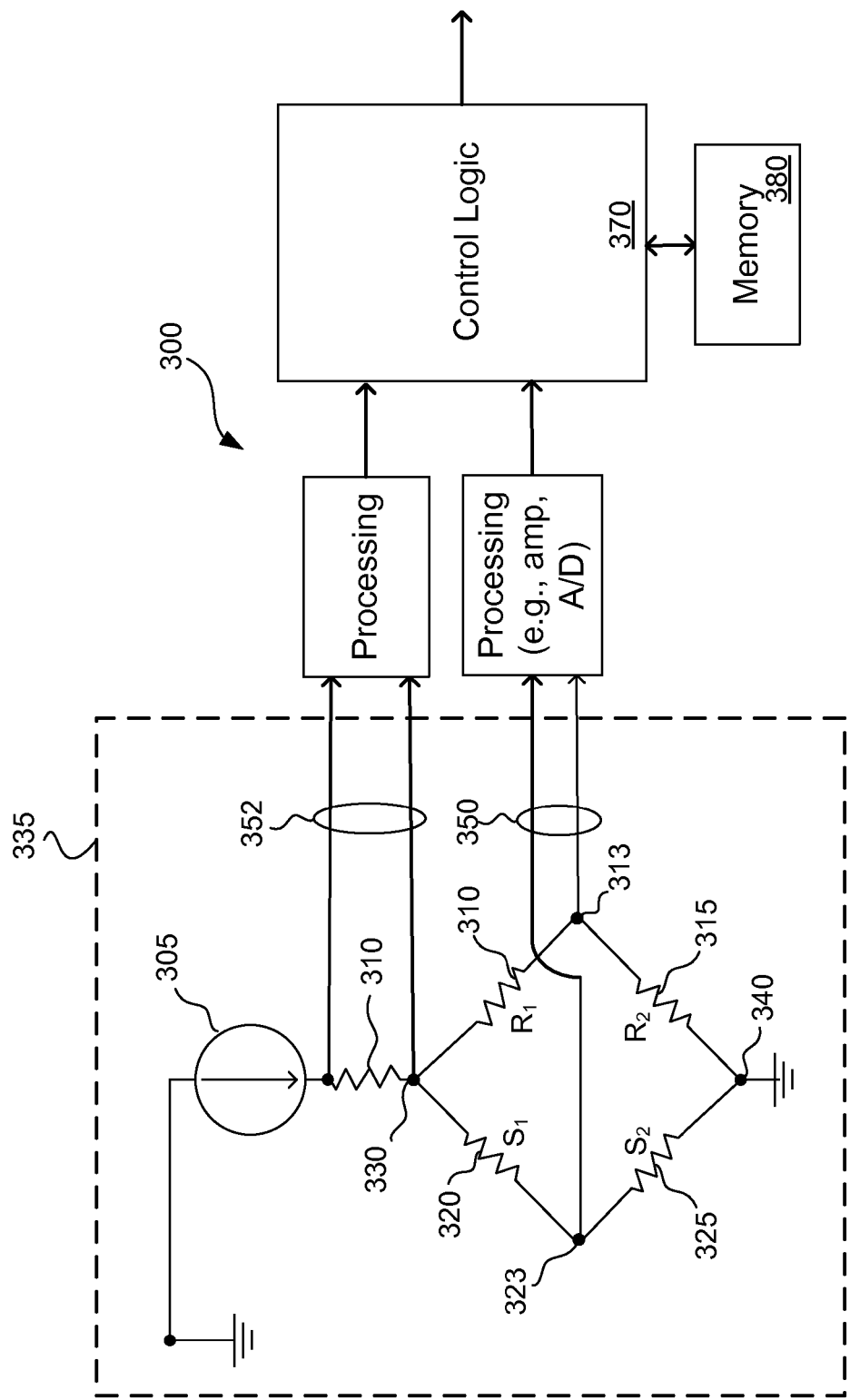
FIG. 3 is a block diagram of another embodiment of a circuit that may be used in connection with the mass flow controller of FIG. 1.

Referring next to FIG. 3, it is a functional block diagram of a portion 300 of an MFC including another embodiment of a sensing-element circuit 335, which may be utilized to realize the sensing element circuit 135 described with reference to FIG. 1. As shown, a variable current source 305 supplies current though resistance 310 to a bridge circuit, which includes four nodes (330, 313, 340, and 333) between which elements are connected. In this embodiment, the top voltage 330 is monitored and the current source 305 is adjusted so that the top voltage 330 remains substantially constant The current source 305 in this embodiment supplies variable current through a resistive element 310 to sensing elements 320 and 325 resulting in the heating of sensor tube 120. The gas flow through sensor tube 120 causes heat to be transferred from the upstream sensing element 125 to the downstream sensing element 130. The change in resistance due to this temperature differential produces a measurable first output voltage between a second node 313 and a fourth node 323 and a second output voltage 352 which is indicative of a voltage drop across the resistance 310.

The output voltage 350 varies with the temperature differential between sensing elements 320 and 325 in an approximately proportional manner, and voltage 352 varies, in a nonlinear manner. In operation, the top voltage 330 is maintained substantially constant, and as a consequence, as the current provided by the current source 305 changes, the voltage 352 changes. As depicted, the output voltages 350, 352 may be fed to processing components to be processed (e.g., amplified, digitized, calibrated, and normalized) so that the control logic may utilize the first and second output signals 350, 352 to control the control valve.

In this exemplary embodiment, the first output signal 350 provides a more accurate indication of the flow rate through the MFC 100 when the flow rate is within in a low flow-rate-range (e.g., 0 to 2 sccm). And Applicants have discovered that the second output signal 352 is a more accurate indication of the flow rate through the MFC 100 when the flow rate is within in a high flow-rate-range (e.g., 2 to 20 sccm).

Figure 4:
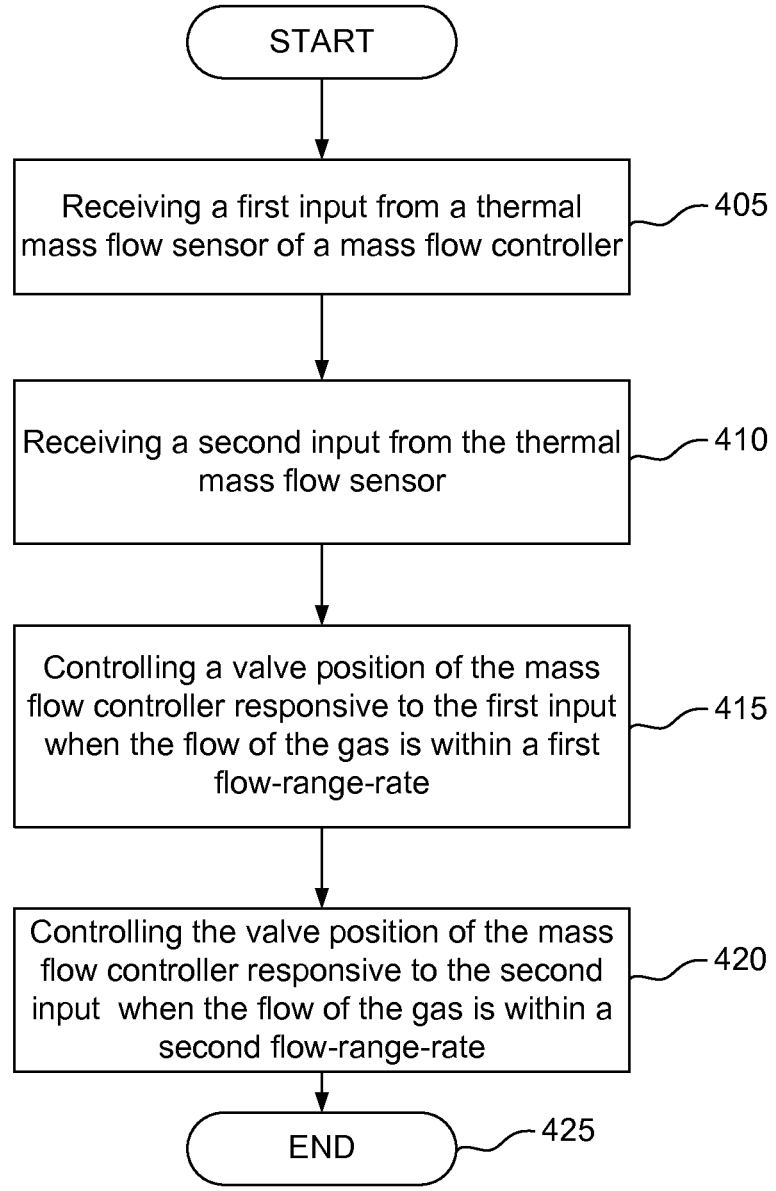
FIG. 4 is a flowchart of a method for controlling the flow rate of a gas in a mass flow controller in accordance with another illustrative embodiment of the invention.

FIG. 4 is a flowchart of a method for measuring and controlling a flow rate of a fluid (e.g., gas or liquid) in an MFC in accordance with one illustrative embodiment of the invention. As shown, the method includes receiving a first input (e.g., the first output signal 150 or its representation 150') from a thermal mass flow sensor (e.g., thermal mass flow sensor 123) of a mass flow controller (e.g., MFC 100) (Block 405), and receiving a second, separate input (e.g., the second output signal 152 or its representation 152') from the thermal mass flow sensor (e.g., thermal mass flow sensor 123) (Block 410). As depicted, the valve position of the mass flow controller is controlled responsive to the first input when the flow of the gas is within a first flow-rate-range (Block 415), and controlled responsive to the second input when the flow of the gas is within a second flow-rate-range (Block 420).

As previously discussed, in many embodiments, the range in which the first signal is used to control the valve overlaps with the range in which the second signal is used to control the valve. As a consequence, in some modes of operation, both the input signals may simultaneously used to control the control valve.

Referring briefly again to FIG. 2, the differential voltage between the second node 213 and the fourth node 223 is indicative of heat flow through the mass flow controller. To arrive at a more accurate measure of the mass flow, the heat capacity (Cp) at constant pressure of the gas is utilized. In many embodiments, the sensor 235 is calibrated with one gas (e.g., Nitrogen) and the ratio of the heat capacities of the calibration gas to the operating gas (e.g., Cp(N2)/Cp(gas)), which is referred to a conversion factor (CF), may be derived.

The conversion factor (CF) may be derived analytically (e.g., as a ratio of well-known heat capacities) or it may be obtained from live gas testing.

Figure 5A:
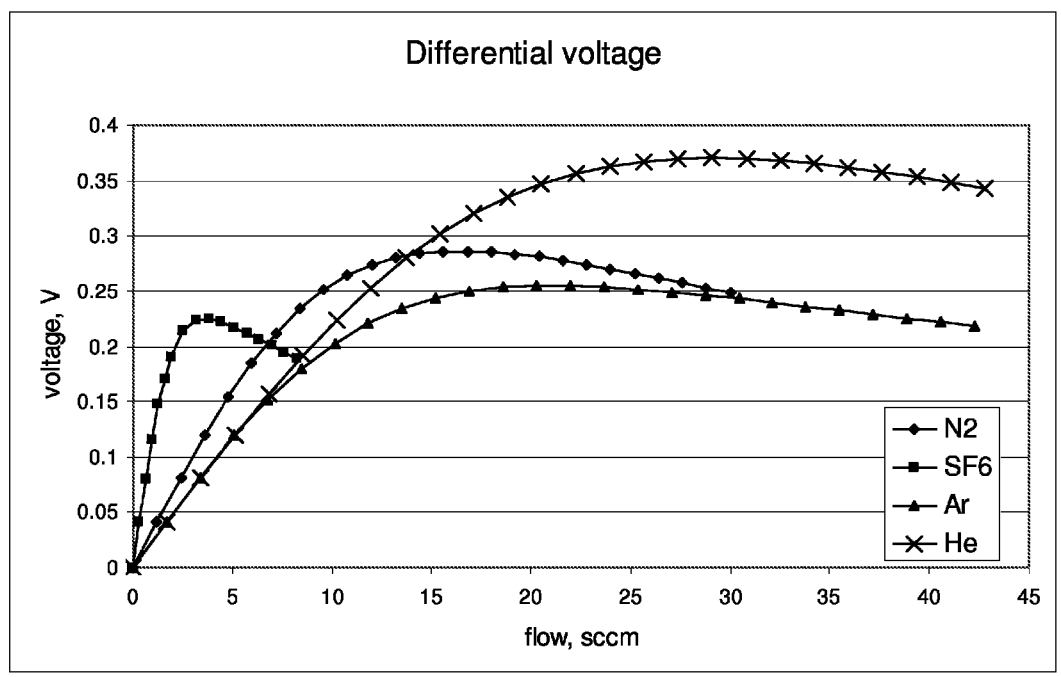
FIGS. 5A and 5B are graphs depicting differential voltage versus flow and a top voltage versus flow, respectively, which have not been adjusted with a conversion factor CF.
Figure 5B:
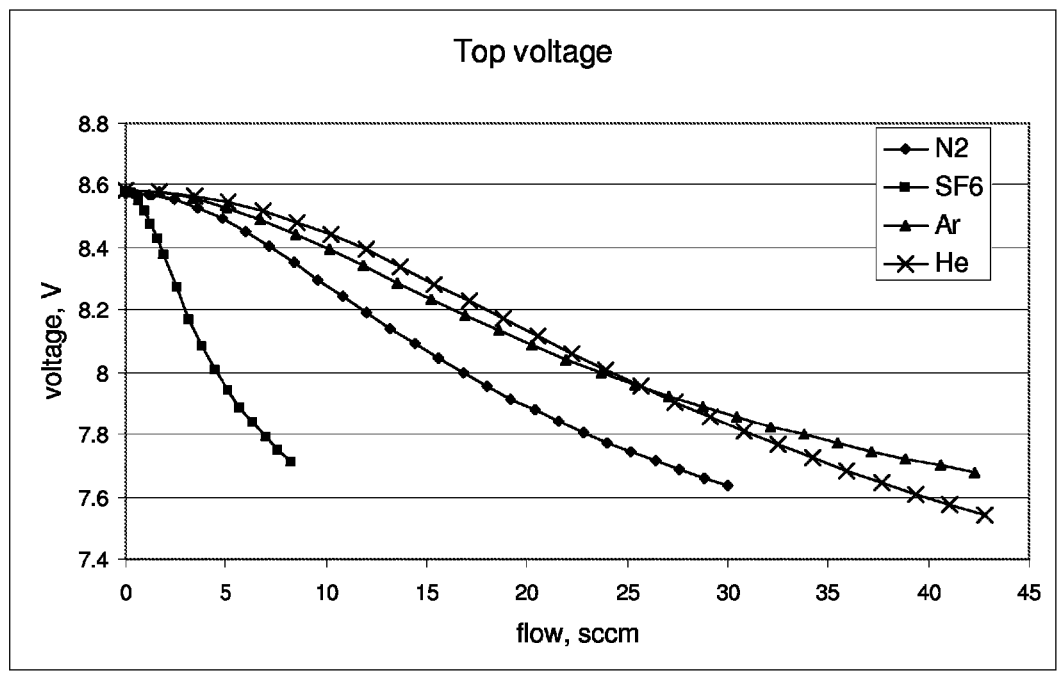
Figure 6A:
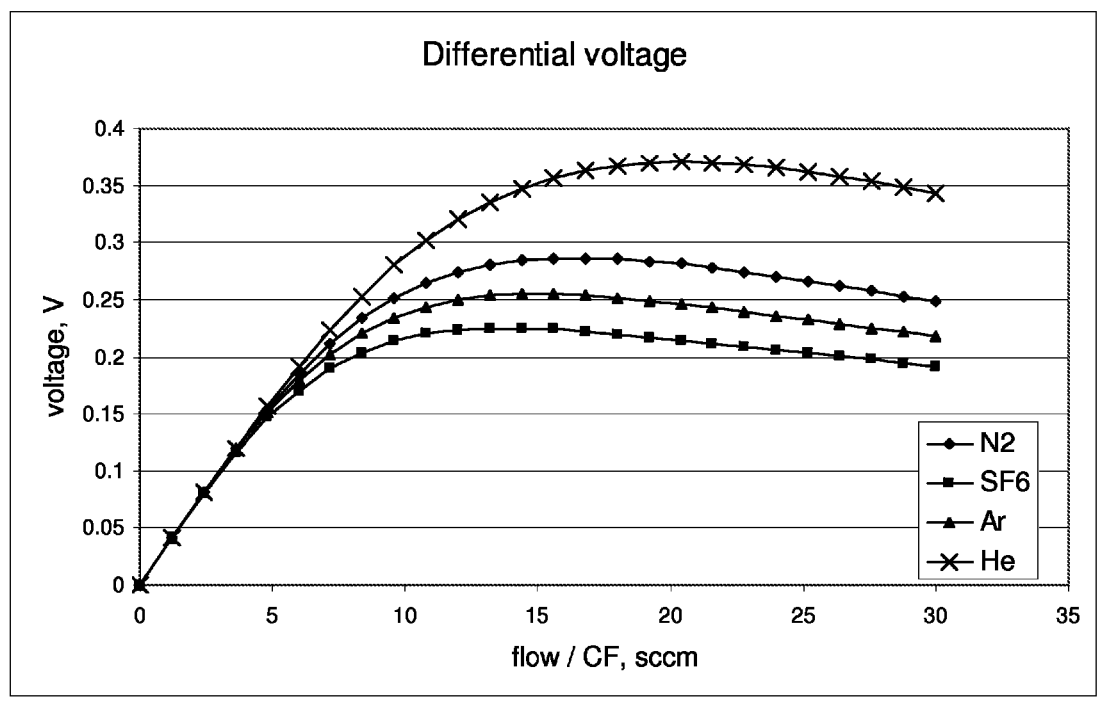
FIGS. 6A and 6B are graphs depicting a differential voltage versus the quotient of flow/CF and a top voltage versus flow/CF.
Figure 6B:
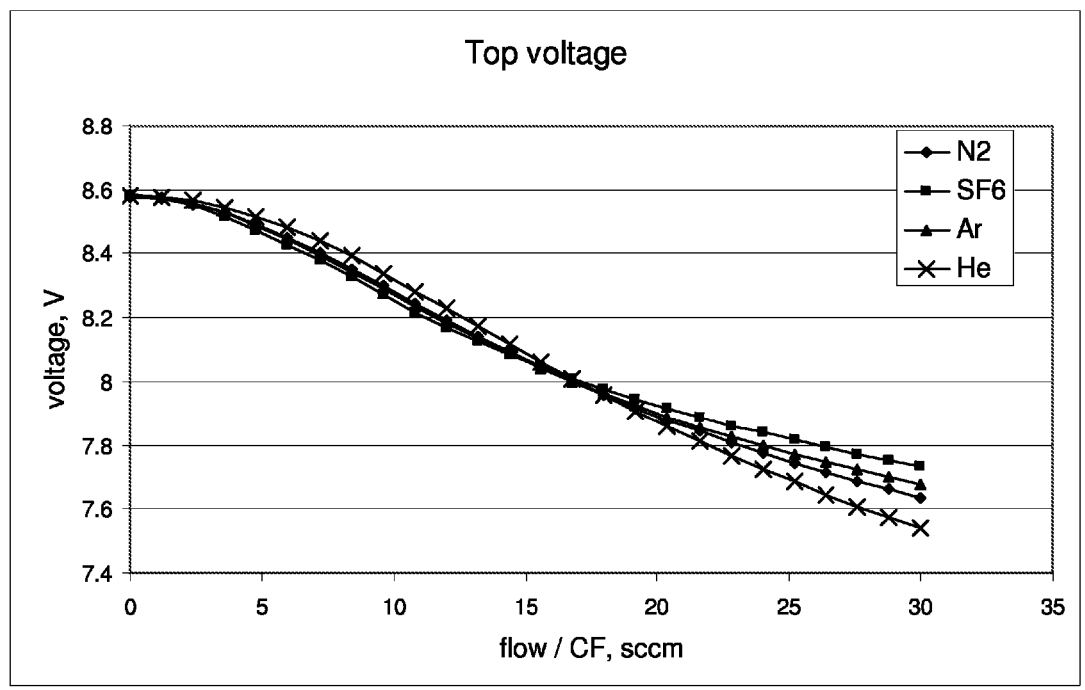
Figure 7:
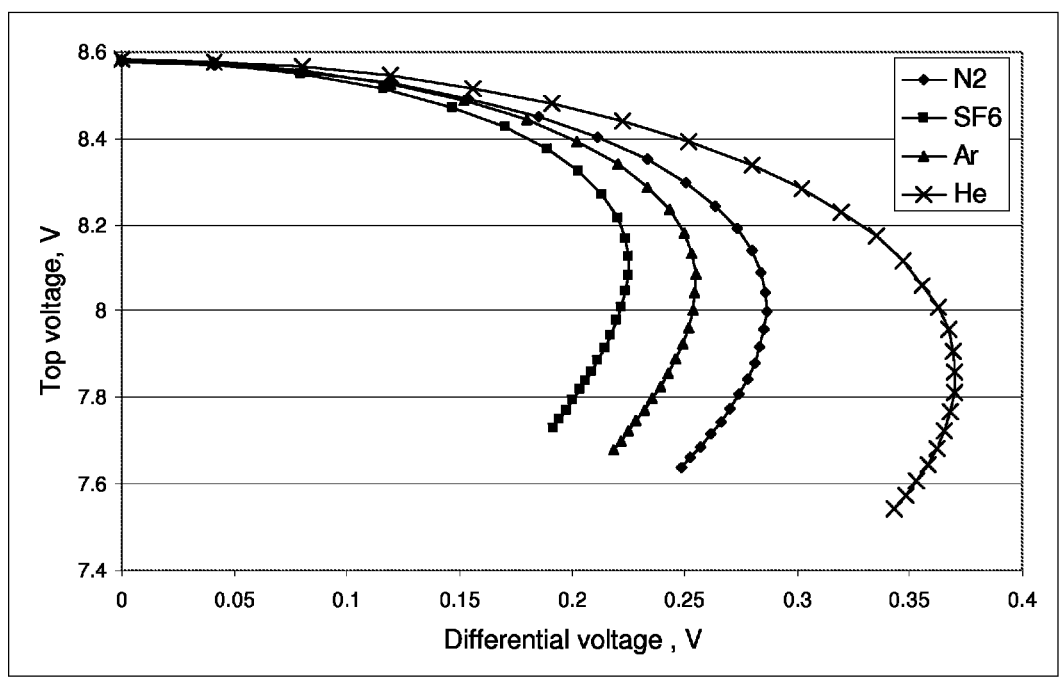
FIG. 7 is a graph depicting the top voltage at the first node versus the differential voltage.

Referring next to FIGS. 5A, 5B, 6A, 6B, and 7, FIG. 5A depicts differential voltage 250 versus flow without adjustment with CF; FIG. 5B depicts a top voltage at the first node 230 versus flow that has not been adjusted with CF; FIG. 6A depicts differential voltage 250 versus the quotient of flow/CF; FIG. 6B. depicts a top voltage at the first node 230 versus flow/CF; and FIG. 7 depicts the top voltage (scaled by a Saturation Factor ("SF")) at the first node 230 versus the differential voltage (scaled by SF) 250.

As depicted in FIG. 6A, the x-axis of the graph is "flow/CF," and as shown, in terms of flow/CF, different gases have a similar slope at low flow (e.g., 0 to 2 sccm or 0 to 3 sccm). As a consequence, the differential voltage (e.g., output voltage 250) may be converted to be more accurately indicative of mass flow by reading the voltage and using the calibration curve in FIG. 6A to obtain a flow/CF value and then the flow/CF value may be multiplied by the conversion factor CF to obtain an actual flow.

At higher flow ranges, however, the calibration curve depicted in FIG. 6A becomes non-linear, and the non-linearity is different for different gases, at least in part, because the nonlinearity depends upon the thermal conductivity of the gases, the sensor tube, and sensor type (e.g., coil composition and geometry). Thus, unlike heat capacity, which is relatively predictable and well known for most gases of interest, thermal conductivity is not. And for many gases, the only known, viable way (outside of the system and method disclosed herein) to obtain a calibration curve at higher flow rates is to do live gas testing, which is costly and typically not practical.

Applicants, however, have found a viable technique for arriving at accurate mass flow readings for multiple gas types at relatively high flow rates. In particular, Applicants have discovered that a well-defined relationship exists between a first measurement channel that includes the voltage differential between the second 213 and fourth 223 nodes of a bridge circuit and a second measurement channel that includes the voltage of the first node 230 (also referred to herein as a top potential) of the bridge circuit. Specifically, Applicants have found that, for any two arbitrary gases (gas 1 and gas 2), the differential voltage 250 and the voltage at the first node 230 of the bridge satisfies the following equations across a wide flow range:

$$D1(f) = D2(SF*f)/SF \quad \text{eqn (1)}$$

$$T1(f) - T1(0) = (T2(SF*f) - T2(0))/SF \quad \text{eqn (2)}$$

where f is flow; D1 and D2 are differential voltage functions for gas 1 and gas 2, respectively (e.g., D1 is the voltage differential between nodes 213 and 223 for gas 1 and D2 is the voltage differential between nodes 213 and 223 for gas 2); T1 and T2 are the top voltage functions (potential at the first node 230) for gas 1 and gas 2, respectively; T(0) is the top voltage at the first node 230 at zero flow; and SF is a saturation factor, which is a function of the thermal conductivity of gas 1 and gas 2.

Figure 8:
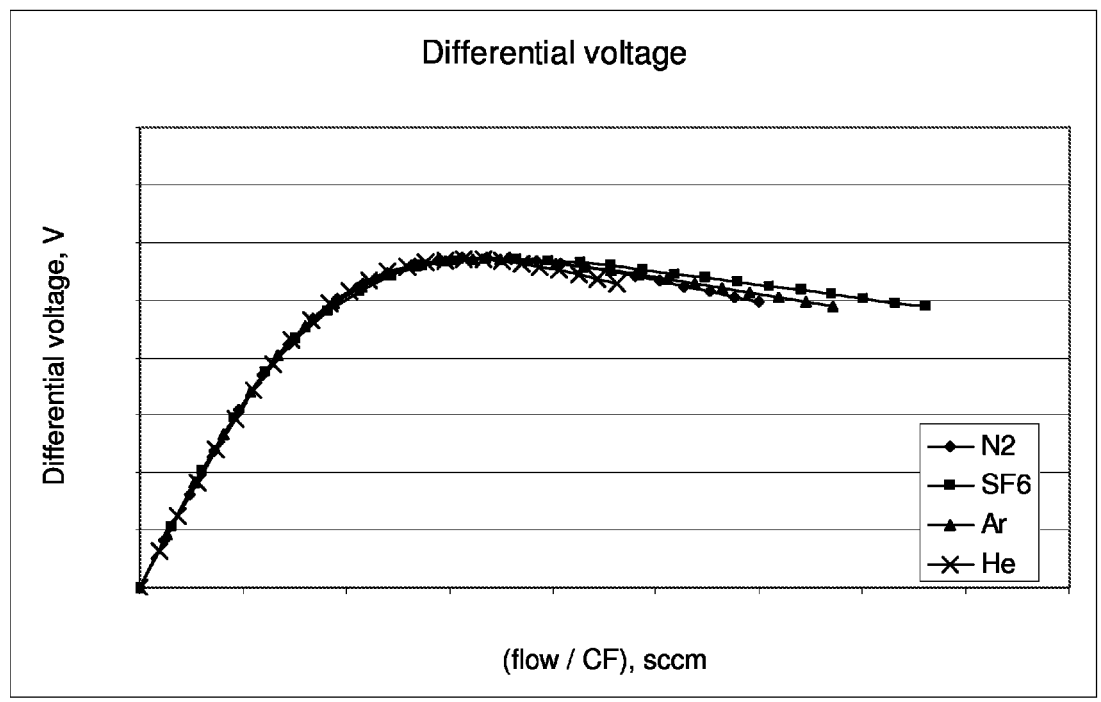
FIG. 8 is a graph depicting differential voltage versus flow when scaled.
Figure 9:
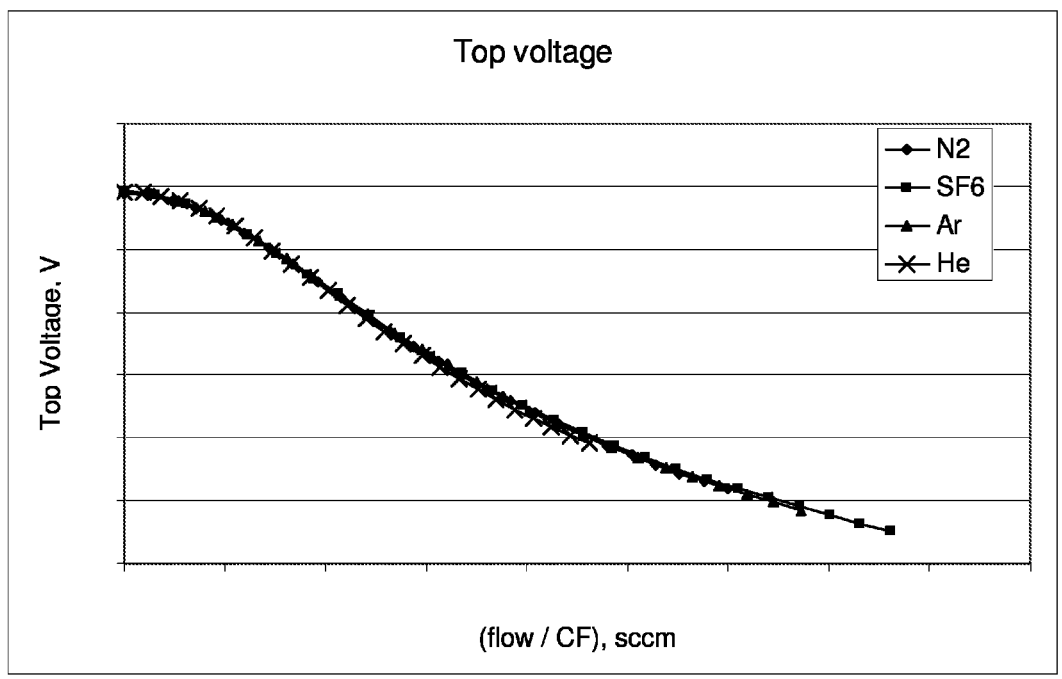
FIG. 9 is a graph depicting the top voltage versus flow when scaled.
Figure 10:
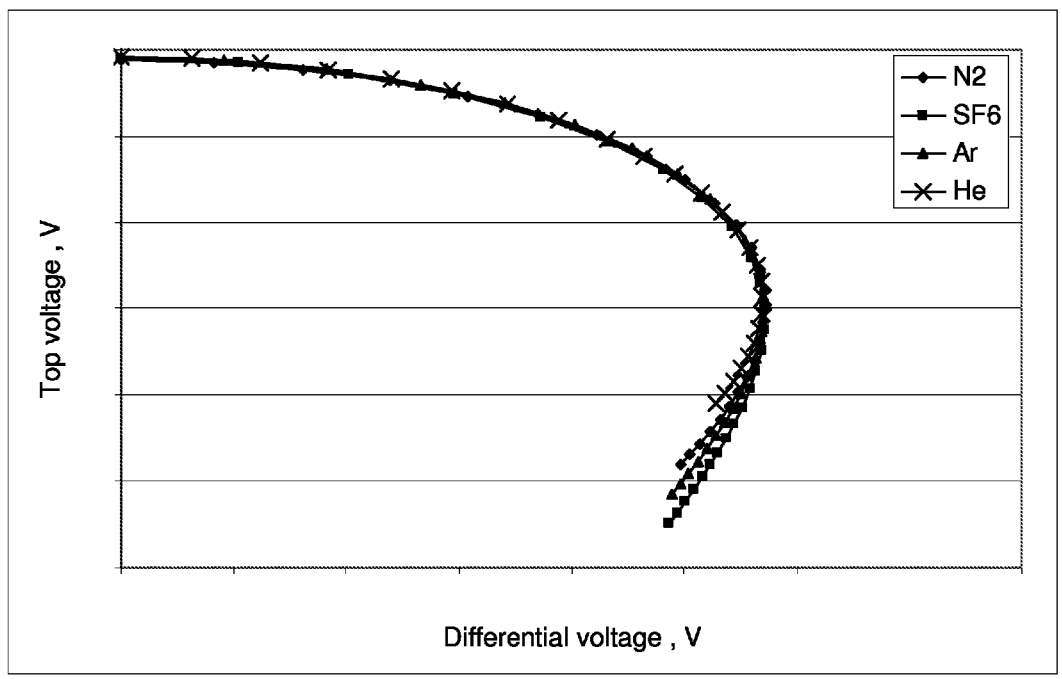
FIG. 10 is a graph depicting top voltage versus differential voltage when scaled.

Graphically, these equations can be represented by scaling both flow and voltage axes of the graph by a saturation factor SF that is a gas specific factor (i.e., SF is different for each gas). FIGS. 8, 9, and 10, for example, depict in accordance with eqn 1. and eqn. 2, scaled versions of the graphs in FIGS. 6A, 6B, and 7, respectively. As shown, when scaled by SF, the data can be scaled to match the calibration (e.g., Nitrogen) data.

Figure 11:
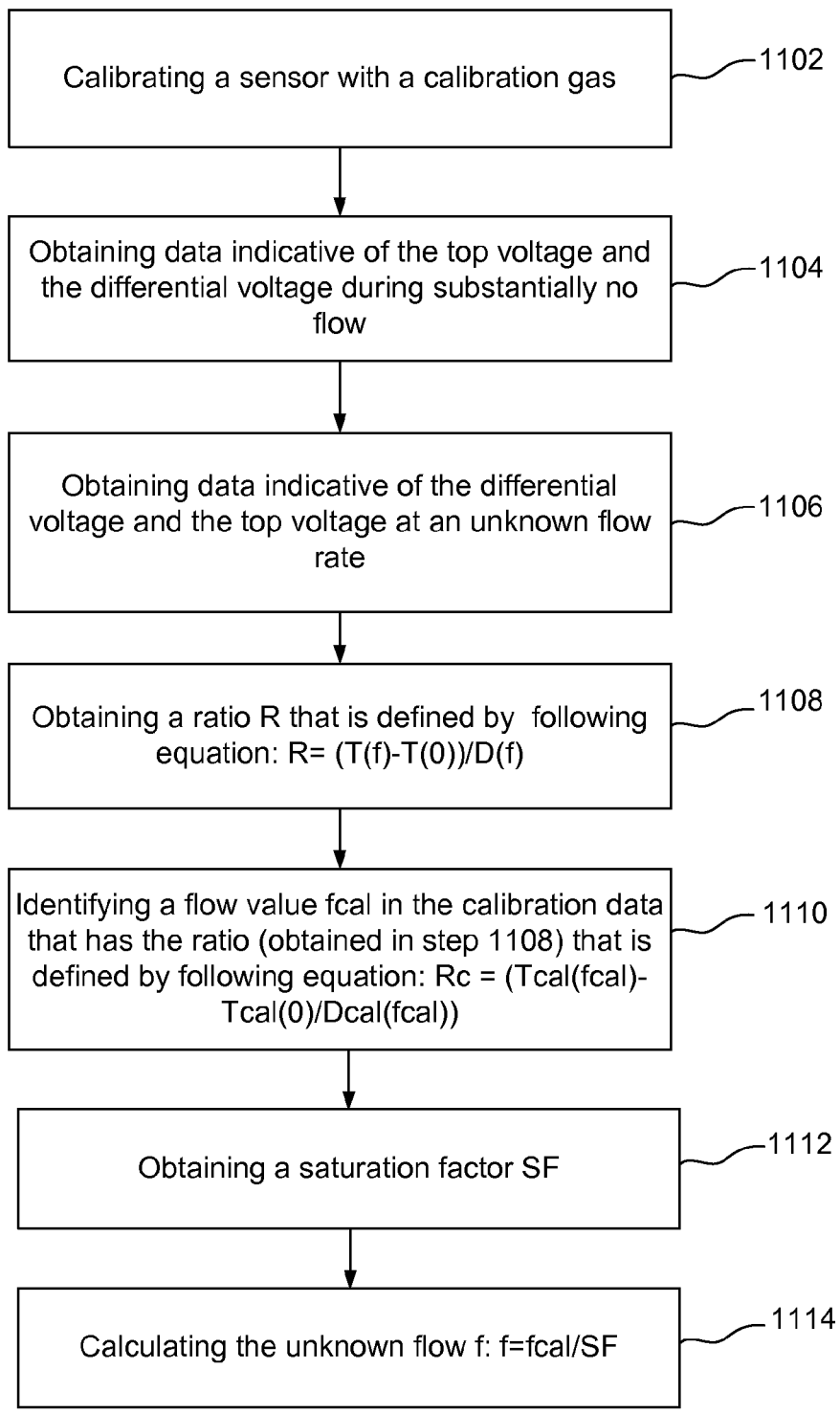
FIG. 11 is a flowchart depicting a method for using a thermal mass flow sensor over a wide operating range.

Referring to FIG. 11, it is a flowchart depicting a method for using a thermal mass flow sensor over a wide operating range. As shown, the sensor is calibrated (e.g., before the sensor is provided to an end user) with calibration gas (e.g., Nitrogen) (Block 1102). In many modes of operation, the calibration data includes data based upon a differential voltage Dcal(fcal) (e.g., voltage 250) and the top voltage Tcal (fcal) at the first node of the bridge (e.g., node 230) as a function of flow fcal. For example, the calibration data in many implementations includes, for each flow value, data indicative of both, the differential voltage 250 and the top voltage 230. The data can be stored in a memory (e.g., memory 280) in the form of a look-up table.

Referring briefly to FIG. 13A for example, the calibration data may be organized into N data sets, and each data set may include a flow value, a value indicative of the differential voltage at that flow value, and a value indicative of the top voltage at that flow value. It is certainly contemplated that the calibration data may take on different forms while being dependent upon two signals from a bridge circuit; thus it should be recognized that the specific data format in FIG. 13A (and FIG. 13B) may vary without departing from the scope of the present invention.

As depicted, the calibration data may be placed in memory (e.g., memory 280) in the form of a look-up table that maps flow values of a calibration gas with calibration data that is based upon values of two outputs (e.g., outputs 150, 152 or outputs 250, 252) from a thermal mass flow sensor (e.g., sensor 123). In addition, each of the N data sets may include a calibration ratio that is based upon the ratio of the top voltage to the differential voltage. As depicted in FIG. 13A, the calibration ratio may be corrected for the zero offset voltage of the top voltage so that, for a particular flow value fcal, the calibration ratio is defined as (Tcal(fcal)−Tcal(0))/Dcal(fcal). Although not depicted in FIG. 13A for simplicity, it is also contemplated that values based upon the differential voltage may be corrected for the zero offset voltage of the differential voltage.

Although not required, as depicted in FIG. 13A, an Amplitude value may also be calculated (and stored in advance of operation) that is defined as sqrt[(Tcal(fcal)−Tcal(0))$^2$+Dcal(fcal)$^2$]. In alternative embodiments, the Amplitude value may be calculated once the mass flow controller is in operation, and in these alternative embodiments, the calibration data need not include the Amplitude value.

As depicted in FIG. 11, once the sensor (e.g., sensor 123) is calibrated and in use, at no flow, the top voltage T(0) at the first node (e.g. node 230) as well the differential voltage D(0) (e.g., voltage 250) are measured (e.g., by operator request or automatically in a periodical manner) to obtain zero-offset data (Block 1104). D(0) and T(0) depend upon temperature and both may drift significantly as temperature changes. With respect to D(0), it is preferably equal to zero, but due to temperature it may not be zero, so the actual value may be measured and subtracted from all D values presented below (but for simplicity this subtraction is not shown below). T(0) also drifts with temperature, and as a consequence, it is subtracted from the top voltage T as indicated below. In operation, for an unknown gas flow "f," the differential voltage D(f) and the top voltage at the first node T(f) are measured (Block 1106), and an operational ratio R is calculated based upon the ratio of the top voltage to the differential voltage so that the operational ratio is defined as: R=(T(f)−T(0))/D(f) (Block 1108). Referring briefly to FIG. 13B, for example, memory may store the measured differential voltage D(f) and the top voltage T(f) and a control portion (e.g., including control logic 270) may be utilized to obtain an operational ratio R.

As depicted, once the operational ratio R is obtained, the flow fcal in the calibration data that has the same calibration ratio defined by: $R_{cal}=(Tcal(fcal)-Tcal(0))/Dcal(fcal)$ is obtained (e.g., by searching and retrieving calibration data from a look-up table in memory) (Block 1110). In other words, the calibration data is accessed and the flow value fcal is identified that has a corresponding calibration ratio $R_{cal}$ that equals the operational ratio R ($R_{cal}$=R), and then a saturation factor SF is calculated: $SF=Amplitude/sqrt[T(f)-T(0))^2+D(f)^2)]$ (Block 1112), and the unknown flow f is calculated: f=fcal/SF (Block 1114). Thus, a control portion (e.g., including control logic 270) may calculate a flow value of a process gas based upon previously generated calibration data and two operational outputs (e.g., outputs 150, 152 or outputs 250, 252) when the process gas is controlled by the mass flow controller.

Figure 12:
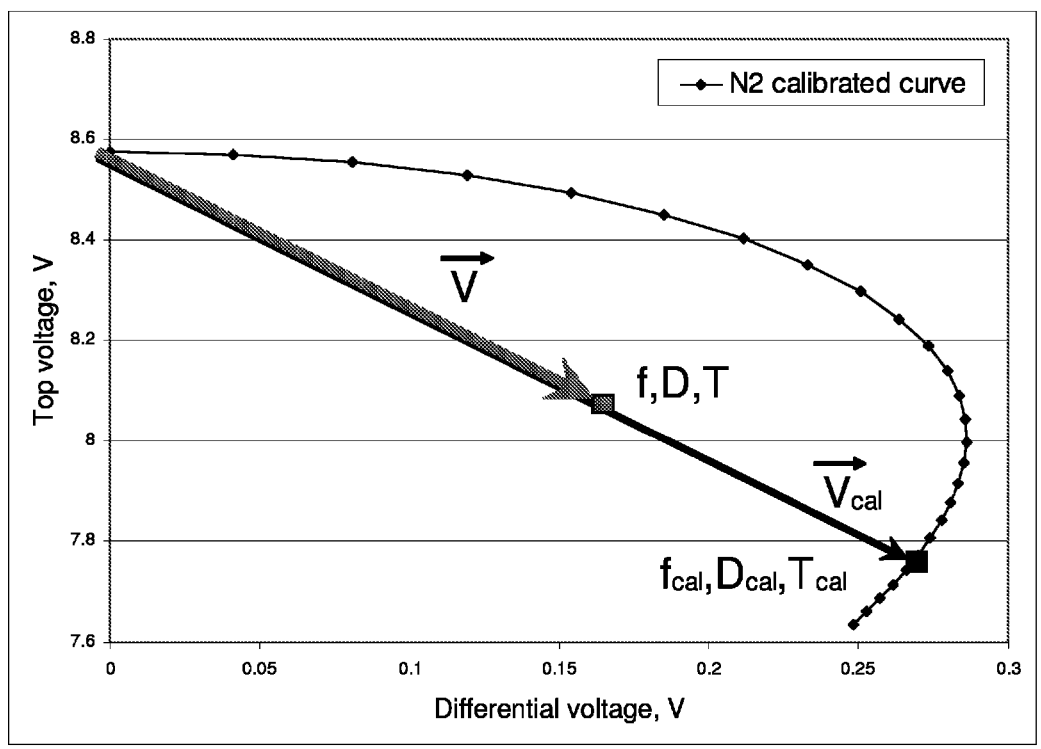
FIG. 12 is a graphical representation of the method depicted in FIG. 11.

Referring to FIG. 12, shown is a graphical representation of the method depicted in FIG. 11. As shown, a measured flow "f" with differential voltage D and a top voltage T at the first node 230 is represented by vector V, with an origin at a zero flow point. The operational ratio R=(T−T(0))/D represents the direction of the vector V. As depicted, a Vector Vcal has the same origin and direction, and points to calibration point with a ratio Rc that is the same as the operational ratio R. The ratio of the amplitudes of vector Vcal and vector V is the saturation factor: SF=abs(Vcal)/abs(V), and the flow f is found by f=fcal/SF. Thus, the structure and methodologies disclosed herein enable flow to be effectively measured for an unknown gas with unknown thermal conductivity over a wide flow range. This example also illustrates the possibility of measuring flow above the saturation point.

At low flow, to reduce the error due to noise and a very small value of top voltage difference (T(f)−T(0)), the flow can be calculated using a standard technique with differential voltage only.

In other variations, while flow is increasing, the voltage at the first node (e.g., node 230) can be used for calculations. Since the saturation factor SF can be measured very accurately at high levels of flow, it is possible to store the SF value obtained at high flow and then use it for calculations at lower flow rates. In addition, SF can be stored in the non-volatile memory as a reference (starting value) for future measurements. And any significant change of SF over time could be an indicator of problems with gas configuration or sensor operation.

Moreover, in some embodiments, some empirical corrections may be further applied to the method described with reference to FIGS. 11 and 12 to improve accuracy at very high flow rates.

In conclusion, the present invention provides, among other things, a method and apparatus for measuring a gas in a mass flow controller. Those skilled in the art can readily recognize that numerous variations and substitutions may be made in the invention, its use, and its configuration to achieve substantially the same results as achieved by the embodiments described herein. Accordingly, there is no intention to limit the invention to the disclosed illustrative forms. Many variations, modifications, and alternative constructions fall within the scope and spirit of the disclosed invention as expressed in the claims.

What is claimed is:

1. A mass flow controller comprising:
    a bridge circuit including a first, second, third, and fourth nodes, a first resistive component being connected between the first and second nodes, a second resistive component being connected between the second and third nodes, a first sensing element being connected between the first and fourth nodes, a second sensing element being connected between the fourth and third nodes;
    a first processing portion to provide a first output that is indicative of a differential voltage between the second and fourth nodes;
    a second processing portion to provide a second output indicative of a top voltage between the first node and the third node;
    a look-up table that maps flow values of a calibration gas with calibration data, the calibration data being based upon values of the differential voltage and the top voltage that correspond to the flow values of the calibration gas; and
    a control portion configured to:
        identify a flow value fcal in the calibration data that has a calibration ratio Rcal that corresponds to an operational ratio R, wherein the operational ratio R is based upon the ratio of the top voltage to the differential voltage and the calibration ratio Rcal is based upon a ratio of a calibration-top-voltage to a calibration-differential-voltage;
        obtain a saturation factor SF, the saturation factor SF defined by a ratio of amplitudes of a calibration vector Vcal and an operational vector V such that SF=abs(Vcal)/abs(V), the direction of the calibration vector defined by the calibration ratio Rcal and the direction of the operational vector V defined by the operational ratio R; and
        calculate an unknown flow f=fcal/SF.

2. The mass flow controller of claim 1, wherein the look-up table maps the flow values of the calibration gas with the calibration data that includes, for each particular flow value of the calibration gas, a value indicative of the first output at the particular flow value, and a value indicative of the second output at the particular flow value.

3. The mass flow controller of claim 2, wherein the look-up table includes, for each particular flow value, the calibration ratio Rcal is based upon a ratio of an adjusted value indicative of the second output at the particular flow value to an adjusted value indicative of the first output at the particular flow value, the adjusted values are values adjusted to remove zero-offset values.

4. The mass flow controller of claim 2, wherein the look up table includes, for each particular flow value, an amplitude of the calibration vector Vcal that is defined by an adjusted value indicative of the second output at the particular flow value and an adjusted value indicative of the first output at the particular flow value, the adjusted values are values adjusted to remove zero-offset values.

5. The mass flow controller of claim 1, wherein the processing portions each include an amplifier and an analog to digital converter.

6. The mass flow controller of claim 1, wherein the control portion includes a component selected from the group consisting of a processor and memory.

7. A mass flow controller, comprising:
    a thermal mass flow sensor including a bridge circuit that includes a first, second, third, and fourth nodes, a first resistive component being connected between the first and second nodes, a second resistive component being connected between the second and third nodes, a first sensing element being connected between the first and fourth nodes, a second sensing element being connected between the fourth and third nodes;
    means for obtaining data indicative of a differential voltage between the second and the fourth nodes of the bridge circuit and a top voltage between the first node and the third node of the bridge circuit at an unknown flow rate;

means for determining an operational ratio R that is based upon a ratio of the top voltage to the differential voltage;

memory including a look-up table that maps flow values of a calibration gas with the calibration data, the calibration data being based upon values of the differential voltage between the second and the fourth nodes and the top voltage between the first node and the third node that correspond to the flow values of the calibration gas;

means for identifying a flow value fcal in calibration data that has a calibration ratio Rcal that corresponds to the operational ratio R, wherein the operational ratio is R is based upon the ratio of the top voltage to the differential voltage and the calibration ratio Rcal is based upon a ratio of a calibration-top-voltage to a calibration-differential-voltage;

means for obtaining a saturation factor SF, the saturation factor SF defined by a ratio of amplitudes of a calibration vector Vcal and an operational vector V such that SF=abs(Vcal)/abs(V), the direction of the calibration vector defined by the calibration ratio Rcal and the direction of the operational vector V defined by the operational ratio R; and means for calculating an unknown flow f=fcal/SF.

* * * * *